(12) United States Patent
Iwamoto

(10) Patent No.: US 6,351,346 B2
(45) Date of Patent: *Feb. 26, 2002

(54) HEAD SLIDER

(75) Inventor: Tohru Iwamoto, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/258,844

(22) Filed: Feb. 26, 1999

(30) Foreign Application Priority Data

Jul. 8, 1998 (JP) ............................................ 10-193348

(51) Int. Cl.[7] ............................ G11B 5/60; G11B 15/64; G11B 17/32; G11B 21/20
(52) U.S. Cl. ................................................... 360/236.4
(58) Field of Search ......................... 360/237.1, 235.4, 360/237, FOR 203, 236.4, 234.3, 234, 230, 235.6

(56) References Cited

U.S. PATENT DOCUMENTS

| | | | | |
|---|---|---|---|---|
| 5,202,803 A | * | 4/1993 | Albrecht et al. | 360/97.02 |
| 5,285,337 A | * | 2/1994 | Best et al. | 360/97.02 |
| 5,418,667 A | * | 5/1995 | Best et al. | 360/237 |
| 5,508,861 A | * | 4/1996 | Ananth et al. | 360/235.4 |
| 6,055,128 A | * | 4/2000 | Dorius et al. | 360/235.8 |

FOREIGN PATENT DOCUMENTS

| | | | |
|---|---|---|---|
| JP | 4-32080 | * | 2/1992 |
| JP | 8-212740 | | 8/1996 |
| JP | 9293223 | | 11/1997 |
| JP | 10-49850 | * | 2/1998 |
| JP | 11-86483 | * | 3/1999 |

* cited by examiner

Primary Examiner—William Klimowicz
Assistant Examiner—Julie Anne Watko
(74) Attorney, Agent, or Firm—Greer, Burns & Crain, Ltd.

(57) ABSTRACT

A head slider comprising a slider body provided with an air bearing surface arranged in one surface of the slider body and a tapered surface arranged adjacent to an air introducing end of the air bearing surface. The head slider is provided with an adhesion-free slider structure, and includes at least one first pad formed on and projecting from the air bearing surface. The first pad is located close to a joint portion between the air bearing surface and the tapered surface. The head slider is also provided with at least one second pad formed on and projecting from the tapered surface, which is located close to the joint portion and away from the first pad. A distance between the first pad and the second pad in an air flow direction may preferably be determined to be at least twice a dimensional tolerance, in the air flow direction, of the tapered surface.

16 Claims, 9 Drawing Sheets

HEAD SLIDER

BACKGROUND OF THE INVENTION

1. Field of the Invention

The present invention relates generally to a head slider which can be incorporated in a disc drive such as a magnetic or optical disc drive. More particularly, the present invention relates to a low-flying type head slider provided on an air bearing surface thereof with a plurality of pads for preventing adhesion of the surface onto a disk surface.

2. Description of the Related Art

In the field of a magnetic disk drive provided with a flying magnetic head system, the flying height of a magnetic head slider has been significantly reduced to improve a packing density of a magnetic recording medium or disk and to downsize the disk drive. As the flying height is reduced, the surface of a magnetic disk must be highly smoothed to avoid a contact between the magnetic head slider and the rotating magnetic disk. In a contact-start-stop (CSS) type magnetic disk drive, however, when the smoothness of the surface of a magnetic disk is improved, a magnetic head slider is likely to adhere to the magnetic disk during the rest condition of the disk, and the normal operation of the magnetic disk drive may be hampered.

To solve the problems of adhesion of the head slider, an adhesion-free slider structure and a zone-textured medium structure has been known. In the adhesion-free slider structure, an air bearing surface (ABS) formed in the head slider for generating flying force is provided with a plurality of pads projecting from the ABS to prevent the adhesion of the latter. In the zone-textured medium structure, a CSS zone in the surface of the magnetic disk, on which the head slider is put during the rest condition of the disk, is locally roughened. These structures are provided to reduce a contact area of the ABS of the magnetic head slider with the surface of the magnetic disk, so as to minimize adhesion or friction force therebetween.

In the conventional magnetic head slider, it is also known that a tapered surface is formed adjacent to the air introducing end of the ABS to allow air to flow onto the ABS, to establish easy and quick flying of the disk when the disk starts to rotate. If the above adhesion-free slider structure is applied to such a magnetic head slider with the tapered surface, the head slider is likely to generate a pitching motion of the slider body in an initial flying stage of the head slider just after the disk starts to rotate. When the magnetic head slider generates pitching, a mutual joint or transit portion between the ABS and the tapered surface is repeatedly brought into contact with the surface of the magnetic disk and is soiled by dust such as powdered materials produced by abrasion. As a result, the reliability of a head-disk interface (HDI) may be deteriorated.

From this view point, the solution has been to form adhesion preventing pads on the magnetic head slider with the tapered surface, wherein at least one pad is formed near the air introducing end so as to extend across the mutual joint or transit portion between the ABS and the tapered surface (see, e.g., Japanese Unexamined Patent Publication (Kokai) No. 9-293223 (JP-A-9-293223)). In this structure, the pad near the air introducing end comes into contact with the magnetic disk surface during the pitching of the magnetic head slider in the initial flying stage thereof, and thereby serves to prevent the joint portion from being soiled due to the contact with the magnetic disk surface.

In the magnetic head slider having the tapered surface provided adjacent to the air introducing end, the tapered surface is normally formed by a machining process, such as grinding, prior to the formation of the ABS on the slider body by, e.g., an ion milling or ion beam etching process. In this occasion, the machined tapered surface tends to have a relatively large dimensional tolerance, in the direction of an air flow and essentially due to the machining process, in the order of dozens of percent of the reference dimension of the tapered surface in the air flow direction. Then, the adhesion preventing pads described above are formed by, e.g., an ion milling or ion beam etching process at a desired position on the machined tapered surface and a surface portion where the ABS is formed at a later stage, after forming the tapered surface and before forming the ABS.

In the adhesion-free slider structure, when a total contact surface area of the adhesion preventing pads with the magnetic disk is reduced, the adhesion or friction force caused between the slider and the disk is lowered according thereto. In this situation, the mutual joint or transit portion between the ABS and the tapered surface tends to have a positional deviation due to the dimensional tolerance caused by the machining process for the tapered surface. On the other hand, the adhesion preventing pads are formed generally accurately at predetermined positions on the surface of the head slider, and the positional deviation of each pad is relatively small. Accordingly, when the adhesion preventing pads are formed, the surface of the pad near the air introducing end, extending across the joint portion, is provided with a surface part generally parallel to the ABS and having the adhesion preventing effect, and the surface area of the surface part may fluctuate.

As a result, the total contact area of the adhesion preventing pads with the magnetic disk may fluctuate, and thereby the adhesion force is uneven between the slider and the disk. That is, even if the adhesion preventing pads are accurately formed at the predetermined positions, the total contact area of the adhesion preventing pads with the magnetic disk is increased according to the reduction of the dimension of the machined tapered surface, which results in an increase in the adhesion force and thus may disturb the normal operation of the magnetic disk drive.

SUMMARY OF THE INVENTION

It is therefore an object of the present invention to provide a head slider, of a low-flying type, which can solve the above-mentioned problems and thus can improve the performance of a disk drive.

It is another object of the present invention to provide a low-flying type head slider, adopting an adhesion-free slider structure, which can eliminate or at least minimize the unevenness of the adhesion force between the slider and a disk, and also can prevent the mutual joint or transit portion between the ABS and the tapered surface from being soiled.

It is further object of the present invention to provide a disk drive incorporating therein an improved head slider to realize a large capacity and high density performance.

In accordance with the present invention, there is provided a head slider comprising a slider body provided with an air bearing surface arranged in one surface of the slider body and a tapered surface arranged adjacent to an air introducing end of the air bearing surface; at least one first pad formed on and projecting from the air bearing surface, the at least one first pad being located close to a joint portion between the air bearing surface and the tapered surface; and at least one second pad formed on and projecting from the tapered surface, the at least one second pad being located close to the joint portion and away from the at least one first pad.

In a preferred aspect of the invention, the first pad is spaced from the joint portion.

Also, in a preferred aspect of the invention, the second pad is spaced from the joint portion.

It is preferred that a distance between the first pad and the second pad in an air flow direction is determined to be at least twice a dimensional tolerance, in the air flow direction, of the tapered surface.

In this arrangement, the dimensional tolerance may be 10% to 30% of a reference size, in the air flow direction, of the tapered surface.

Plural first pads may be arranged opposite to respective plural second pads in relation to the joint portion.

The head slider may further comprise at least one third pad formed on and projecting from the air bearing surface and the tapered surface, the at least one third pad extending across the joint portion.

The at least one first pad may be disposed on one side of the slider body in relation to the air flow direction.

In this arrangement, the at least one second pad may be disposed on one side of the slider body in relation to the air flow direction.

The present invention also provides a disk drive comprising the head slider mentioned above.

The disk drive may further comprise a disk provided with a locally roughened region on a surface of the disk, wherein another side opposite to the one side of the slider body of the head slider is positioned nearer the locally roughened region than the one side.

The present invention further provides a head slider comprising a slider body provided with an air bearing surface arranged in one surface of the slider body and a tapered surface arranged adjacent to an air introducing end of the air bearing surface; and at least one pad formed on and projecting from the air bearing surface, the at least one pad being located close to a joint portion between the air bearing surface and the tapered surface and outside of the tapered surface even when the tapered surface has a dimension, in an air flow direction, of the maximum limit of size.

BRIEF DESCRIPTION OF THE DRAWINGS

The above and other objects, features, and advantages of the present invention will become more apparent from the following description of preferred embodiments in connection with the accompanying drawings, in which.

DESCRIPTION OF THE PREFERRED EMBODIMENT

Figure 1A:
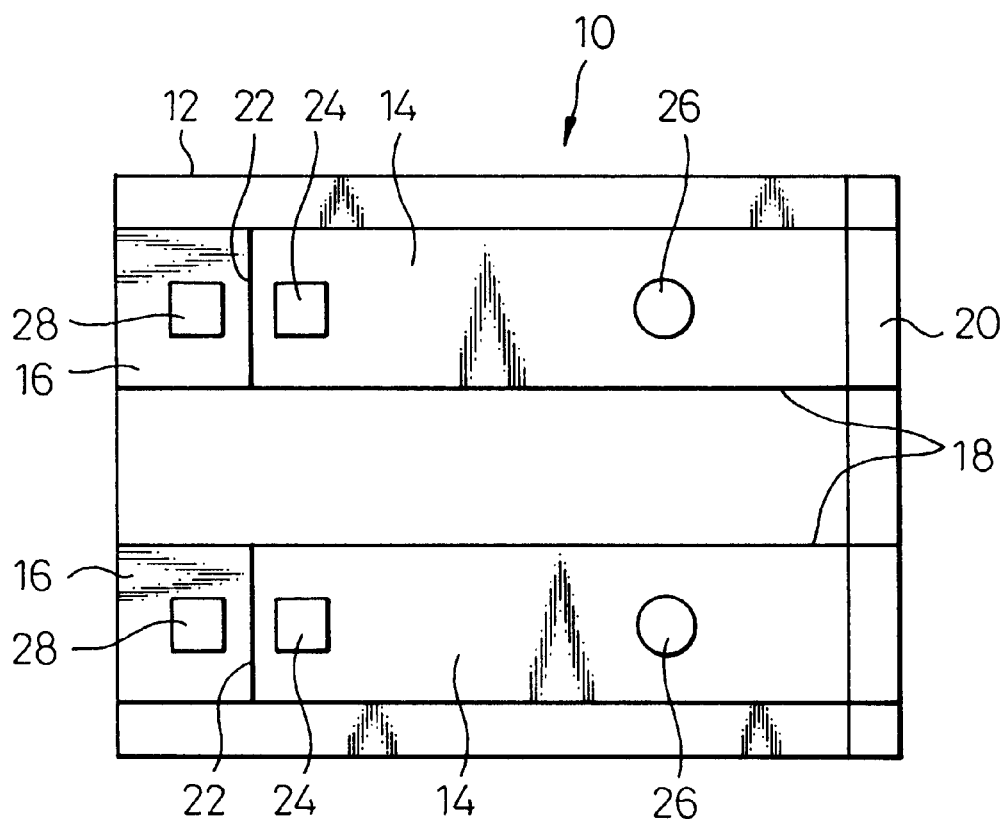
FIG. 1A is a bottom plan view of a magnetic head slider according to one embodiment of the present invention.
Figure 1B:
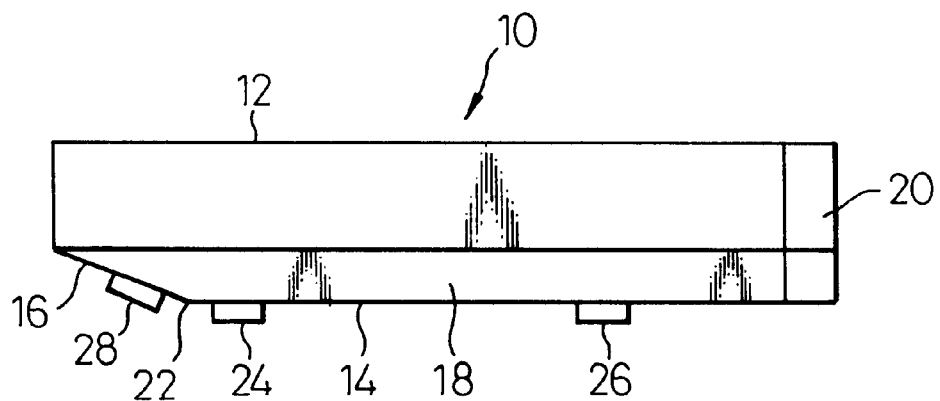
FIG. 1B is a side view of the magnetic head slider of FIG. 1A.
Figure 2:
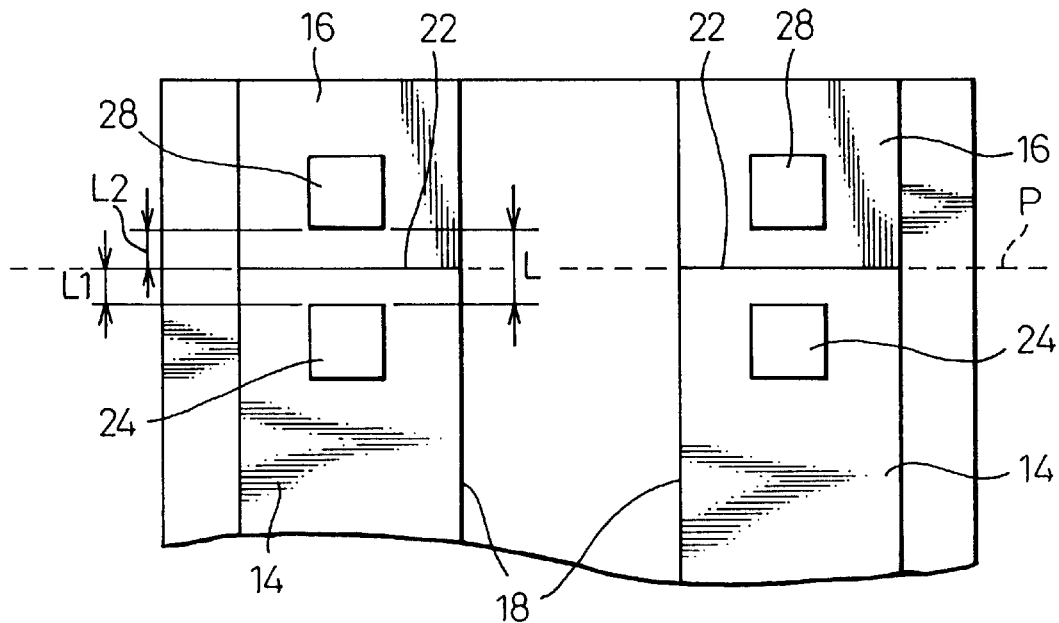
FIG. 2 is a partially enlarged bottom plan view of the magnetic head slider of FIG. 1A.

Referring now to the drawings, in which the same or similar components are denoted by the same reference numerals, FIGS. 1A and 1B diagrammatically show a magnetic head slider 10 according to one embodiment of the present invention. The magnetic head slider 10 includes a slider body 12 with a generally rectangular shape in a plan view, a pair of air bearing surfaces (ABSs) 14 formed on a major surface of the slider body 12 for generating flying force, and a pair of tapered surfaces 16 formed respectively adjacent to the air introducing ends of the ABSs 14 on the slider body 12 for facilitating an air flow to be introduced on the ABSs 14. The ABSs 14 are respectively provided on the surfaces of two rails 18 which are formed on the major surface of the slider body 12 by, e.g., an ion milling or ion beam etching process. The tapered surfaces 16 are respectively formed on the rails 18 adjacent to the air introducing ends of the latter by a machining process such as a grinding. A head section 20 incorporating recording/reproducing elements (not shown) therein is provided adjacent to the air discharging ends of the ABSs 14.

The magnetic head slider 10 is provided with an adhesion-free slider structure in which a plurality of pads are formed to project at predetermined positions on each ABS 14 for preventing the adhesion of the ABS. The adhesion preventing pads of the magnetic head slider 10 include a pair of "air introducing side" pads 24 arranged so as to be one for each ABS 14 and close to joint or transit portions 22 mutually joining the ABSs 14 and the corresponding tapered surfaces 16, and a pair of "air discharging side" pads 26 arranged so as to be one for each ABS 14 and spaced away from the respective air introducing side pads 24 toward the air discharging ends of the ABSs 14. Each of the air introducing side pads 24 constitutes a first pad of the present invention. In the illustrated embodiment, each first pad 24 is spaced from each joint portion 22 toward the air discharging end.

The magnetic head slider 10 also includes a pair of auxiliary pads 28 arranged so as to be one for each tapered surface 16 and close to the joint portions 22 and spaced from the respective first pads 24 toward the air introducing ends of the ABSs 14 by a predetermined distance described below. Each of the auxiliary pads 28 constitutes a second pad of the present invention. In the illustrated embodiment, each second pad 28 is spaced from each joint portion 22 toward the air introducing end. Also in the illustrated embodiment, each second pad 28 is arranged opposite to each first pad 24 in relation to the joint portion 22. It should be noted that the term "close to" in this specification, defining a positional relationship between the first and second pads 24, 28 and the joint portion 22, means not only such an arrangement as shown in FIG. 1 wherein the first and second pads 24, 28 are slightly spaced from the joint portion 22 toward the air discharging and introducing ends, respectively, but also such an arrangement as described later in connection to FIG. 7A or 9A wherein the front edge of the first pad 24 or the rear edge of the second pad 28 is aligned with the joint portion 22.

One example of a process for forming a plurality of pads on a magnetic head slider is disclosed in JP-A-9-293223 and shown in FIGS. 1 to 5 attached thereto. The magnetic head slider 10, according to one embodiment of the present invention, may be produced by a process generally corresponding to the prior art process described in this publication. The manufacturing process for the magnetic head slider 10 is described below.

First, a stick-shaped member is cut out of a wafer on which a plurality of magneto electro transducers (recording/reproducing elements) are formed, and tapered surfaces 16 are formed on the stick-shaped member by a machining process. Then, a pad layer is provided by laminating a diamond-like-carbon (DLC) lamina over the machined tapered surfaces 16 and surface portions where ABSs 14 are formed at a later stage. The pad layer is covered at desired pad-forming areas thereof with a resist film, and then is etched to form pads 24, 26, 28 at desired positions. Thereafter, rails 18 respectively including the ABSs 14 on which the pads 24, 26, 28 are carried are formed through another etching process. Finally, the stick-shaped member with the rails 18 and the pads 24, 26, 28 being formed thereon is cut to produce the magnetic head slider 10.

In the above manufacturing process for the magnetic head slider 10, a mask pattern for separately masking the predetermined pad forming areas in the resist film, which are defined on the tapered surfaces 16 and the surface portions for ABSs 14, is used in the first etching process. The mask pattern includes mask sections located so as not to extend across the joint portions 22 between the tapered surfaces 16 and the surface portions for ABSs 14. The resist film masked with this mask pattern is exposed and developed, and thereby resist film parts are left separately on the tapered surfaces 16 and the surface portions for ABSs 14. In this state, the DLC lamina is etched, and thereby the plural pads, including the first or air introducing side pads 24 and the second or auxiliary pads 28, are formed on the tapered surfaces 16 and the surface portions for ABSs 14 under a characteristic positional relationship described later.

In the magnetic head slider 10 manufactured by the above process, the first or air introducing side pads 24, the air discharging side pads 26 and the second or auxiliary pads 28 are formed with surface areas substantially identical to each other. Although FIG. 1B shows the rail and pads in an enlarged scale, especially for the height thereof, the height of each rail 18 on the slider body 12 is normally on the order of several am, while the height of each of the first pad 24, the air discharging side pad 26 and the second pad 28 on the ABS 14 and the tapered surface 16 is normally on the order of several tens of nm.

A linear distance "L" (FIG. 2) measured in the direction of an air flow between the first pad 24 and the second pad 28 on each rail 18 is designed to be at least twice the dimensional tolerance of each tapered surface 16 defined in the air flow direction. That is, in FIG. 2, if each tapered surface 16 is machined into a reference size and each joint portion 22 lies along a reference position "P", a linear distance "L1" measured in the air flow direction between the joint portion 22 and the first pad 24 represents an upper tolerance, while a linear distance "L2" measured in the air flow direction between the joint portion 22 and the second pad 28 represents a lower tolerance. It should be noted that, in this specification, the "dimensional tolerance" means the difference between a reference size and a maximum or minimum limit of size, the "upper tolerance" means the difference between the reference size and the maximum limit of size and the "lower tolerance" means the difference between the reference size and the minimum limit of size.

In the magnetic head slider 10, the dimensional tolerance of the machined tapered surface 16 is, for example, 10% to 30% of the reference size of the tapered surface 16 measured in the air flow direction. In this case, if the reference size of the tapered surface 16 measured in the air flow direction is 100 $\mu$m and the dimensional tolerance is 10% of the reference size, the length of the tapered surface 16 measured in the air flow direction may be in the range of 90 $\mu$m to 110 $\mu$m.

Figure 3:
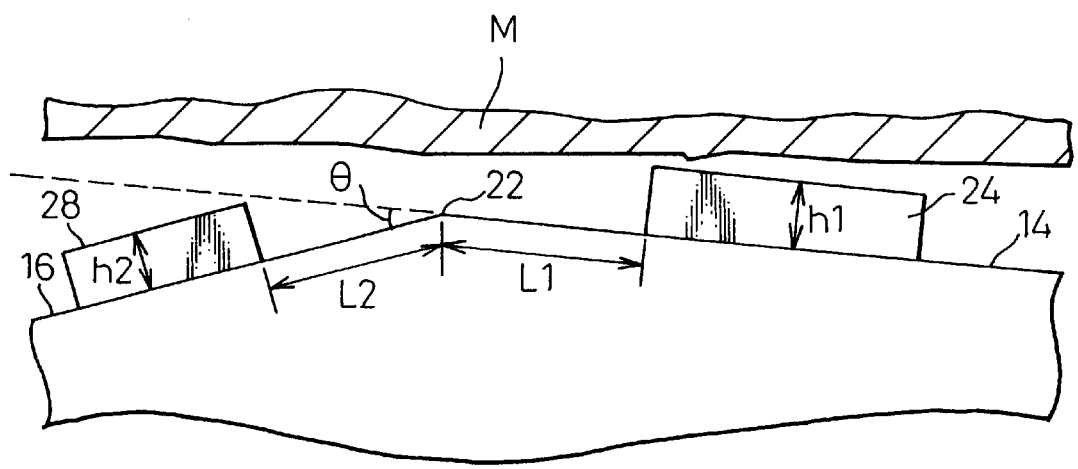
FIG. 3 is a partially enlarged side view of the magnetic head slider of FIG. 1A and a magnetic disk, showing the dimension and position of the head slider.

The position and the dimension of each first pad 24 and each second pad 28 are selected on condition that both pads 24, 28 on each rail 18 can cooperate to prevent each joint portion 22 from coming into contact with the surface of the magnetic disk "M" (FIG. 3). For example, in FIG. 3, it should be comprehended that the contact between the joint portion 22 and the magnetic disk surface can be prevented, if the taper angle $\theta$ of the tapered surface 16 relative to the ABS 14, the height "h1" of the first pad 24, the height "h2" of the second pad 28, the distance "L1" between the joint portion 22 and the first pad 24, and the distance "L2" between the joint portion 22 and the second pad 28 have a mutual relationship defined as follows:

$$\tan^{-1}(h1/L1)+\tan^{-1}(h2/L2)>\theta$$

Accordingly, supposing that the reference size of the tapered surface 16 measured in the air flow direction is 100 $\mu$m, the dimensional tolerance thereof is 10 $\mu$m, and the height "h1", "h2" of each of the first and second pads 24, 28 is 50 $\mu$m, it is necessary to determine each of the distance "L1", "L2" between the joint portion 22 and the first and second pads 24, 28 in the range of 10 $\mu$m to 12.5 $\mu$m.

The optimum value of the total surface area of the first or air introducing side pads 24 and the air discharging side pads 26 may be selected depending on the roughness of the magnetic disk surface, the lubricant properties, and so on. The surface area of the second or auxiliary pads 26 is not specified. The profile of the surface of each of the first pads 24, the air discharging side pads 26 and the second pads 28 may be various shapes such as a circle, an ellipse, a rectangle, and so on. The location of the air discharging side pad 26 on each rail 18 may be selected in a desired area as far as it does not contact the magnetic disk surface during the flying state of the head slider.

The magnetic head slider 10 having the above structure possesses various remarkable characteristic effects as follows. The slider 10 adopting the adhesion-free slider structure makes it possible to effectively reduce the flying height thereof by highly smoothing the surface of the magnetic disk "M" (FIG. 3) as a medium. The second, auxiliary pad 28 formed on each rail 18 and the first, air introducing side pad 24 opposite thereto relative to the joint portion 26 cooperate to come into contact with the surface of the magnetic disk "M" during the pitching motion of the magnetic head slider 10 generated in an initial flying stage thereof, and thereby preventing each joint portion 22 between the first and second pads 24, 28 from being soiled due to the contact with the surface of the magnetic disk "M".

Also, as far as each tapered surface 16, formed by a machining process, has a length in the air flow direction in which there may be an error in the dimensional tolerance, it is possible to prevent both the first and second pads 24, 28 formed thereafter from being located across the joint portion 22. Consequently, the fluctuation of the total surface area of contact of the air introducing and discharging side pads 24, 26 with the magnetic disk can be prevented, and thereby the unevenness of the adhesion or friction force between the slider and the disk can be eliminated. As a result, as far as each of the air introducing and discharging side pads 24, 26 are accurately formed at desired positions, it is possible to obtain an adhesion force conforming to a desired value, even when each tapered surface 16 is formed with an error in the dimensional tolerance.

Figure 4:
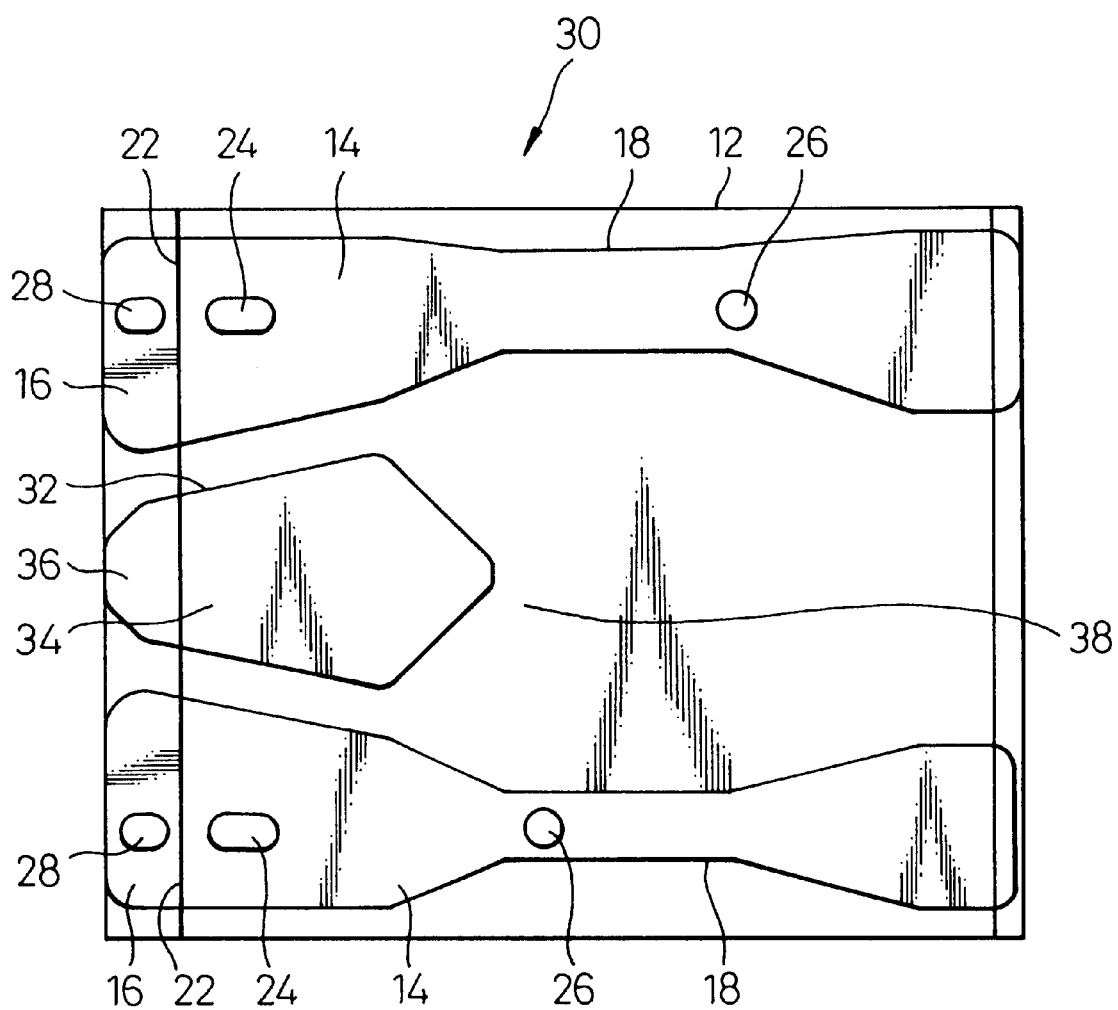
FIG. 4 is a bottom plan view of the concrete example of the magnetic head slider of FIG. 1A.

FIG. 4 shows a magnetic head slider 30 which is the concrete example of the above magnetic head slider 10. The magnetic head slider 30 has a structure similar to the magnetic head slider 10, and the components of the slider 30 identical or corresponding to the components of the slider 10 are denoted by the common reference numerals and are not repeatedly described. The magnetic head slider 30 includes an additional center rail 32 formed at a location near the air introducing end and between a pair of side rails 18. The center rail 32 is provided on the surface thereof with an air bearing surface (ABS) 34 and a tapered surface 36. A negative pressure face 38 is formed at the downstream side, defined in the air flow direction, of the center rail 32, on which a negative pressure is generated due to air flowing beyond the center rail 32.

Figure 5:
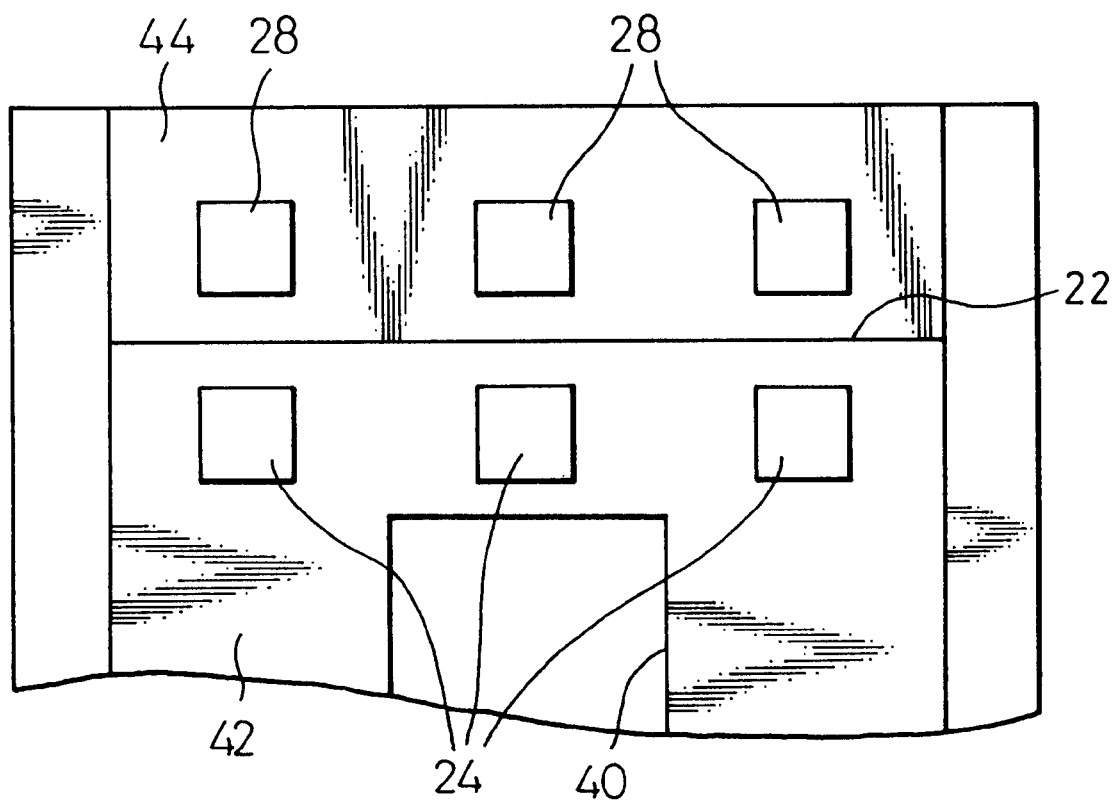
FIG. 5 is a partially enlarged bottom plan view of the modification of the magnetic head slider of FIG. 1A.

The magnetic head slider 30 is provided with a first or air introducing side pad 24, an air discharging side pad 26 and a second or auxiliary pad 28 on each side rail 18. Therefore, the magnetic head slider 30 possesses the characteristic effects similar to those of the magnetic head slider 10. Further, the magnetic head slider 30 may be provided with a first or air introducing side pad and a second or auxiliary pad which can be formed on the ABS 34 and the tapered surface 36 of the center rail 32 in the same manner. All of such modifications are within the scope of the present invention. For example, in a magnetic head slider having a U-shaped rail 40 designed by connecting the side rails 18 and the center rail 32 as shown in FIG. 5, plural first or air introducing side pads 24 and plural second or auxiliary pads 28 may be formed on an air bearing surface 42 and a tapered surface 44, respectively.

Figure 6:
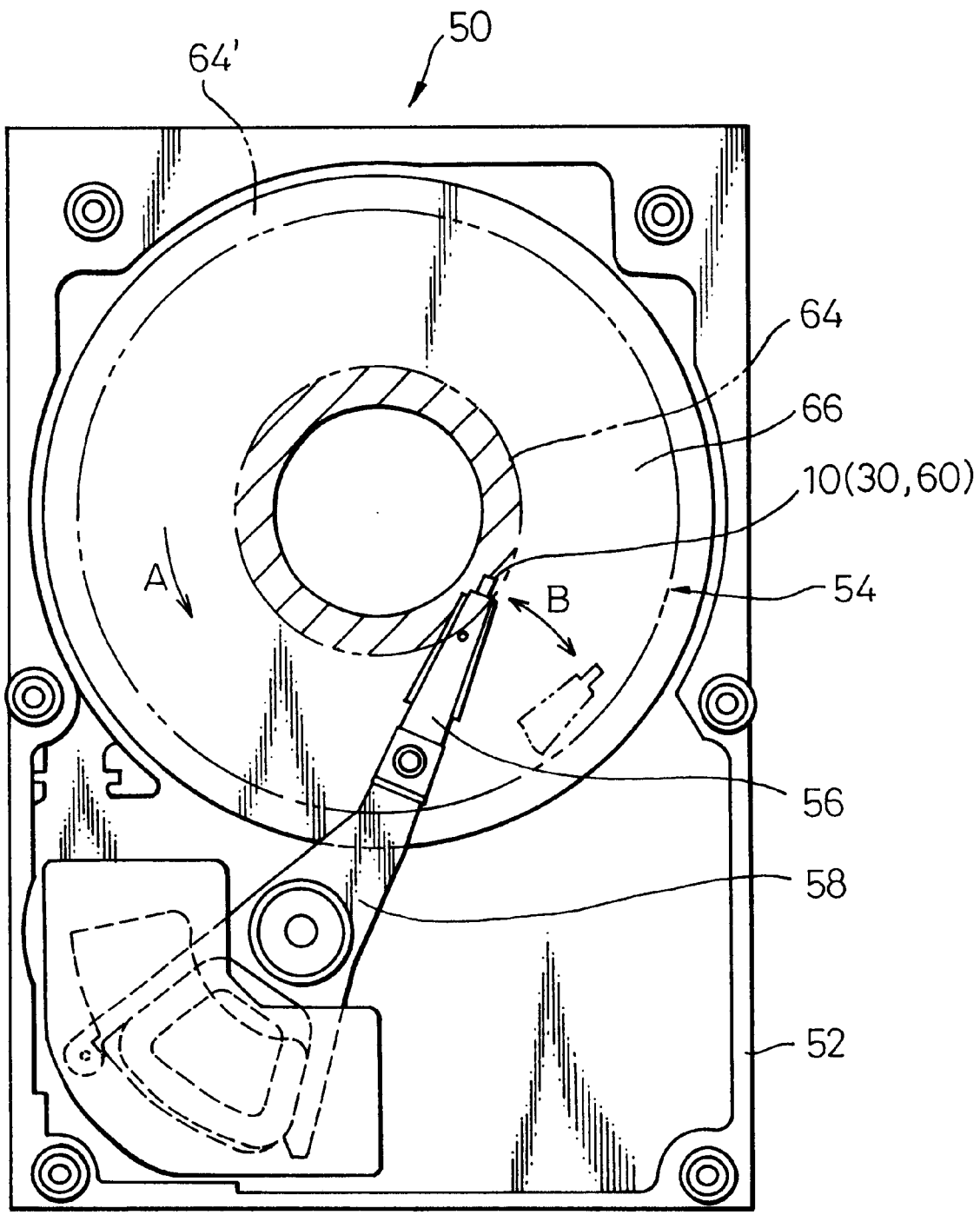
FIG. 6 is a schematic plan view of a magnetic disk drive which can utilize the magnetic head slider of FIG. 1A.

FIG. 6 shows the internal structure of a magnetic disk drive 50 according to an embodiment of the present invention, into which the above magnetic head slider 10 or 30 is incorporated. The magnetic disk drive 50 includes a base 52 as a part of a housing, a magnetic disk 54 rotating at high speed in a direction shown by an arrow A on the base, and an arm 58 carrying the magnetic head slider 10 or 30 on the distal end of a suspension 56. The arm 58 is swung in a direction shown by an arrow B on the base 52, and the magnetic head slider 10 or 30 scans the surface of the magnetic disk 54 in a radial direction. Normally, a plurality of magnetic disks 54 are stacked coaxially and rotate synchronously, and the arm 58 as well as the magnetic head slider 10 or 30 are arranged at both sides of each magnetic disk 54. In the magnetic disk drive 50, it is possible to improve the capacity and density of the recording properties due to the above-described characteristic effects of the magnetic head slider 10 or 30.

Figure 7A:
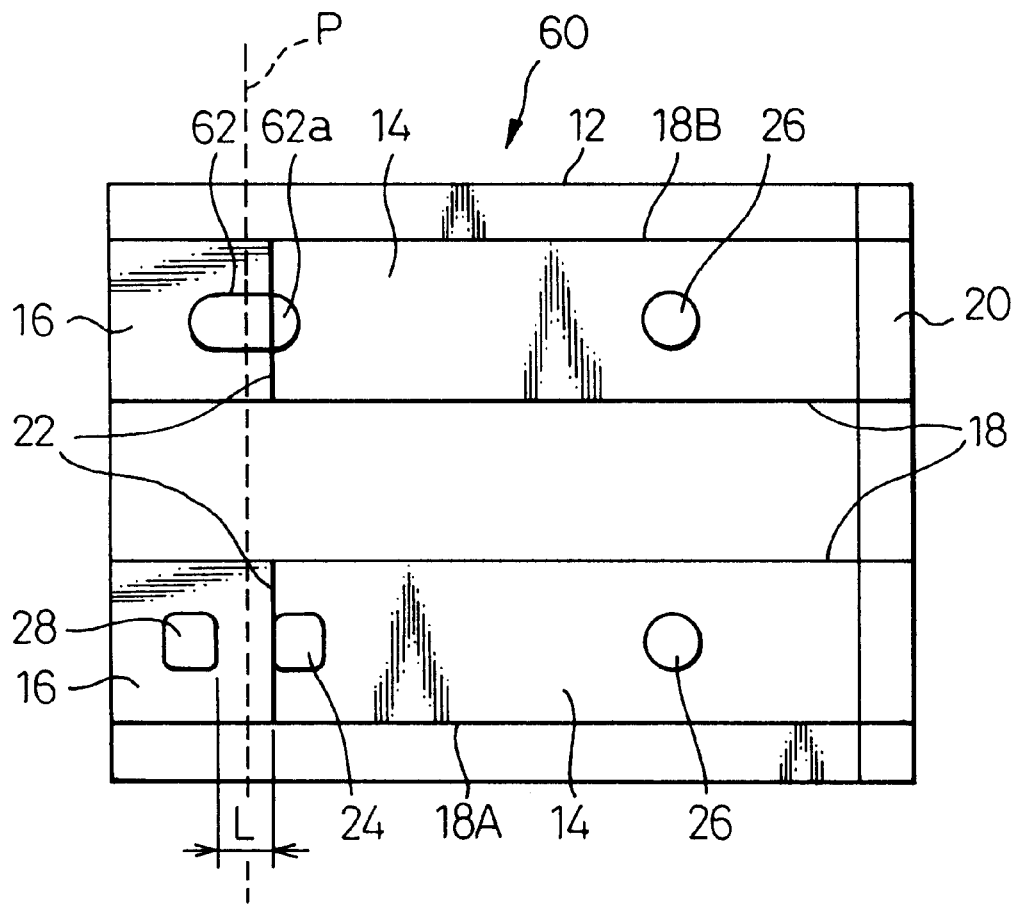
FIG. 7A is a bottom plan view of a magnetic head slider according to another embodiment of the present invention.
Figure 7B:
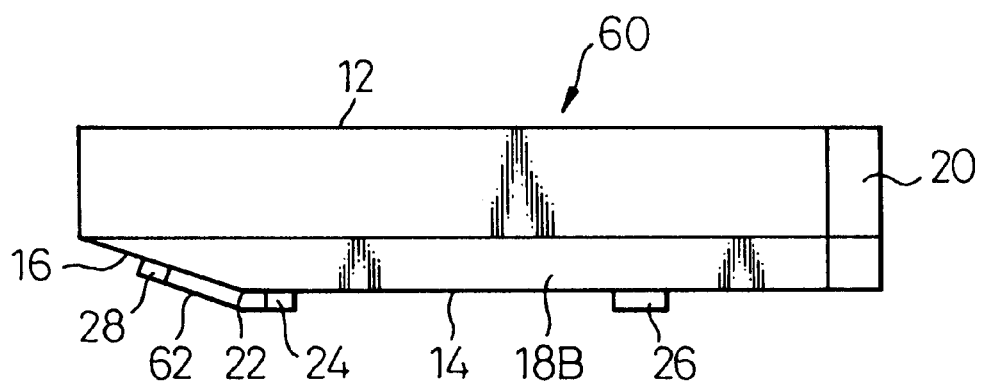
FIG. 7B is a side view of the magnetic head slider of FIG. 7A.

In the magnetic head slider 10, 30 of the above embodiments, all of the first, air introducing side pads 24 are arranged on the ABSs 14 close to the joint portions 22 without extending across the latter, while the second, auxiliary pads 28 are arranged opposite to the respective first pads 24 in relation to the joint portions 22. However, the present invention is not limited to such a structure, but may be constructed to arrange only some of the first pads 24 so as not to extend across the joint portions 22. FIGS. 7A and 7B diagrammatically show a magnetic head slider 60 provided with such a structure, according to another embodiment of the present invention. The components of the magnetic head slider 60 identical or corresponding to the components of the magnetic head slider 10 are denoted by the common reference numerals and are not repeatedly described.

The magnetic head slider 60 includes a first rail 18A and a second rail 18B, which are respectively formed near the opposed side edges, defined in relation to an air flow direction, of a slider body 12. The magnetic head slider 60 is provided on the first rail 18A with a first or air introducing side pad 24 arranged on an ABS 14 so as to be close to a joint or transit portion 22 mutually joining the ABS 14 and a corresponding tapered surface 16, an air discharging side pad 26, and a second or auxiliary pad 28 arranged on the tapered surface 16 so as to be close to the joint portion 22 and spaced from the first pad 24 toward the air introducing ends of the ABS 14.

A linear distance "L" measured in the air flow direction between the first, air introducing side pad 24 and the second, auxiliary pad 28 on the first rail 18A is determined to be at least twice the dimensional tolerance of the tapered surface 16 defined in the air flow direction. In this embodiment, the front edge, defined in the air flow direction, of the first pad 24 is aligned with the joint portion 22. Therefore, in this arrangement, the tapered surface 16 of each rail 18 is formed into the maximum limit of size in the air flow direction. That is, each joint portion 22 is shifted or deviated from the reference position "P" toward the air discharging end of the ABS.

The magnetic head slider 60 is also provided on the second rail 18B with an air introducing side pad 62 arranged on an ABS 14 and a corresponding tapered surface 16 so as to extend across a joint or transit portion 22 mutually joining the ABS 14 and the tapered surface 16, and an air discharging side pad 26 arranged so as to be spaced away from the air introducing side pad 62 toward the air discharging end of the ABS. The air introducing side pad 62 constitutes a third pad of the present invention. Therefore, the third pad 62 serves to prevent the adhesion of the ABS to a magnetic disk only in the surface part 62a located downstream, defined in the air flow direction, of the joint portion 22.

In the magnetic head slider 60 having the above structure, the first or air introducing side pad 24, the second or auxiliary pad 28 and the third or air introducing side pad 62 cooperate to prevent each joint portion 22 of each rail 18 from being soiled due to the contact with the surface of the magnetic disk during the pitching motion of the magnetic head slider 60 generated in an initial flying stage thereof. Regarding the third, air introducing side pad 62, if the joint portion 22 is shifted or deviated in the air flow direction due to the fluctuation of the dimension of the machined tapered surface 16, the surface area of the surface part 62a of the third pad 62 varies to affect the adhesion force between the slider and the disk. On the other hand, in the first rail 18A, as far as the tapered surface 16 has a length in the air flow direction of which an error is within the dimensional tolerance, it is possible to prevent both the first and second pads 24, 28 from being located across the joint portion 22, in the same manner as in the magnetic head slider 10. Consequently, the fluctuation of the total surface area of contact of the first and third pads 24, 62 as well as the air discharging side pads 26, with the magnetic disk can be minimized, and thereby the unevenness of the adhesion or friction force between the slider and the disk can be reduced. As a result, it is possible for the magnetic head slider 60 to obtain the adhesion force approximately equal to a desired value.

The above magnetic head slider 60 may be effectively used in a magnetic disk drive adopting a zone-textured medium structure, wherein a CSS zone in the surface of the magnetic disk, on which the head slider 60 is put during the rest condition of the disk, is locally roughened. For example, in the magnetic disk drive 50 shown in FIG. 6, the magnetic disk 54 may include a roughened surface portion as a CSS zone 64 in the inner peripheral region of the disk surface, and the magnetic head slider 60 may be incorporated in such a manner that the second rail 18B thereof is oriented to the inner peripheral region of the magnetic disk 54 and surely located on the CSS zone 64 during the rest condition of the disk. According to this arrangement, it is possible to prevent the adhesion force between the slider and the disk from being affected, even if the surface area of the surface part 62a of the third pad 62 is varied due to the fluctuation of the dimension of the machined tapered surface 16. That is, when the magnetic head slider 60 is located at a position slightly shifted in the radial direction of the disk 54 during the rest condition of the latter and only the first rail 18A departs from the CSS zone 64 to be put on a data zone 66, the first or air introducing side pad 24 and the air discharging side pad 26 on the first rail 18A can prevent the adhesion of the ABS.

Figure 8:
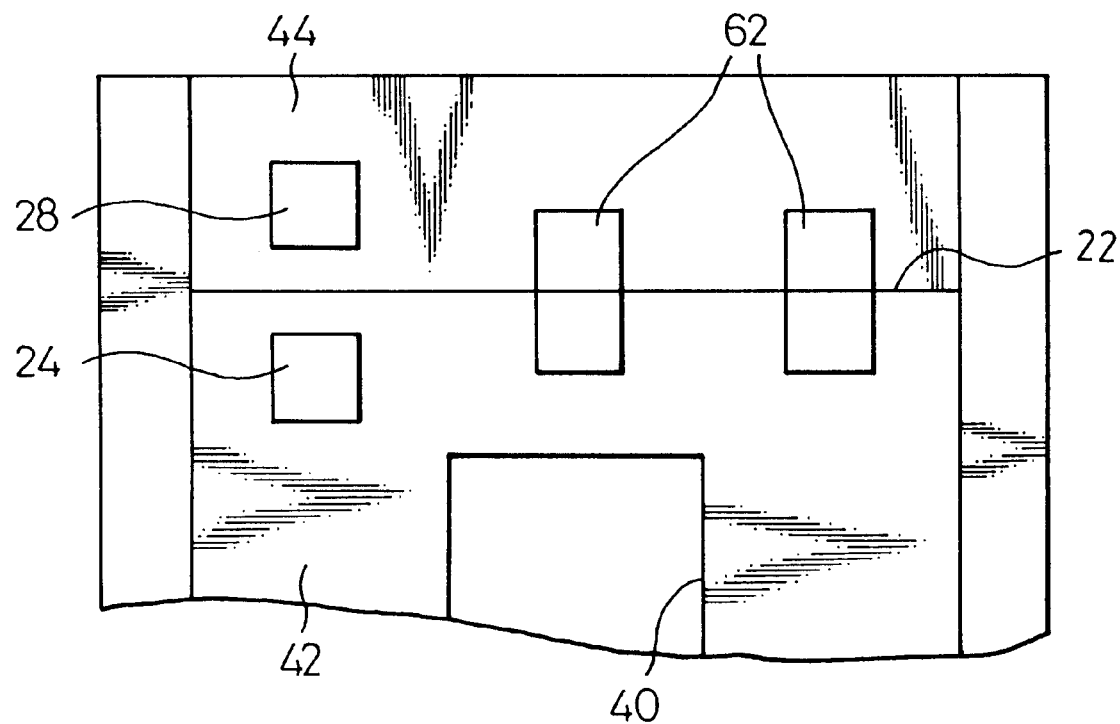
FIG. 8 is a partially enlarged bottom plan view of the modification of the magnetic head slider of FIG. 7A.

The above-described arrangement of the first and third pads 24, 62 in the magnetic head slider 60 may also be utilized in a magnetic head slider having a U-shaped rail 40 as shown in FIG. 8. In this case, a desired number of first, second and third pads 24, 28, 62 may be formed on an ABS 42 and a tapered surface 44. When the first pad 24 and the counterpart second pad 28 are arranged on one side of a slider body in relation to an air flow direction, the magnetic head slider may be effectively used in a magnetic disk drive adopting the above-described zone-textured medium structure.

Figure 9A:
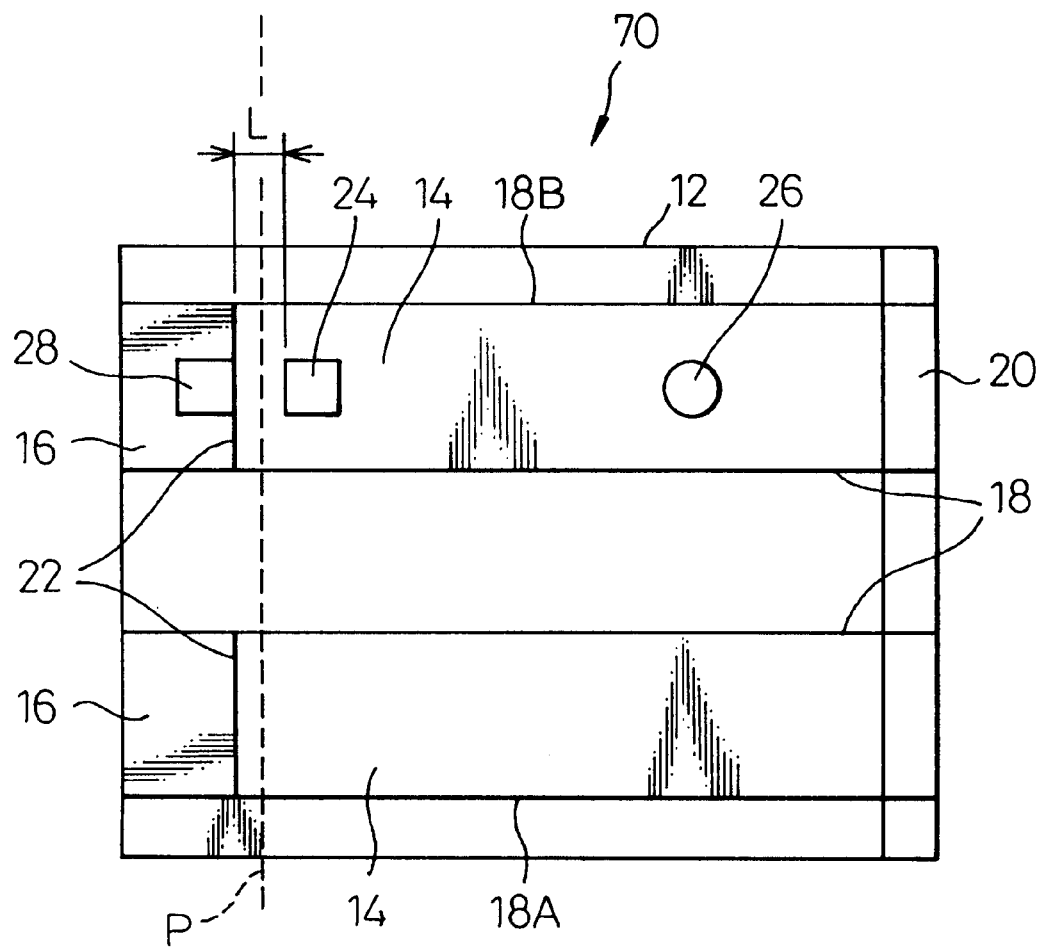
FIG. 9A is a bottom plan view of a magnetic head slider according to further embodiment of the present invention.
Figure 9B:
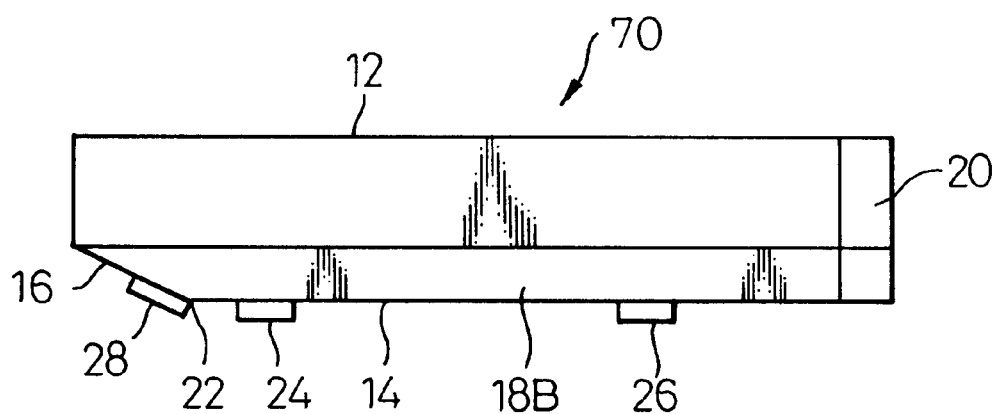
FIG. 9B is a side view of the magnetic head slider of FIG. 9A.

If a magnetic head slider is used in a magnetic disk drive adopting a zone-textured medium structure, it is also possible to arrange all of adhesion preventing pads on one side of a slider body in relation to an air flow direction. FIGS. 9A and 9B diagrammatically show a magnetic head slider 70 provided with such a structure, according to further embodiment of the present invention. The components of the magnetic head slider 70 identical or corresponding to the components of the magnetic head slider 10 are denoted by the common reference numerals and are not repeatedly described.

The magnetic head slider 70 includes a first rail 18A and a second rail 18B, which are respectively formed near the opposed side edges, defined in relation to an air flow direction, of a slider body 12. The magnetic head slider 70 is provided on the first rail 18A with no adhesion preventing pad, and only on the second rail 18B with a first or air introducing side pad 24, an air discharging side pad 26, and a second or auxiliary pad 28.

A linear distance "L" measured in the air flow direction between the first, air introducing side pad 24 and the second, auxiliary pad 28 on the second rail 18B is determined to be at least twice the dimensional tolerance of the tapered surface 16 defined in the air flow direction. In this embodiment, the rear edge, defined in the air flow direction, of the second pad 28 is aligned with the joint portion 22. Therefore, in this arrangement, the tapered surface 16 of each rail 18 is formed into the minimum limit of size in the air flow direction. That is, each joint portion 22 is shifted or deviated from the reference position "P" toward the air introducing end of the ABS.

The magnetic head slider 70 having the above structure may also be effectively used in, e.g., the magnetic disk drive 50 shown in FIG. 6, which adopts a zone-textured medium structure. In this case, the magnetic disk 54 may include a roughened surface portion as a CSS zone 64' in the outer peripheral region of the disk surface, and the magnetic head slider 70 may be incorporated in such a manner that the first rail 18A thereof is oriented to the outer peripheral region of the magnetic disk 54 and surely located on the CSS zone 64' during the rest condition of the disk. According to this arrangement, it is possible to prevent the adhesion between the slider and the disk. Also, when the magnetic head slider 70 is located at a position slightly shifted in the radial direction of the disk 54 during the rest condition of the latter and only the second rail 18B departs from the CSS zone 64' to be put on a data zone 66, the first or air introducing side pad 24 and the air discharging side pad 26 on the second rail 18B can prevent the adhesion of the ABS.

Figure 10:
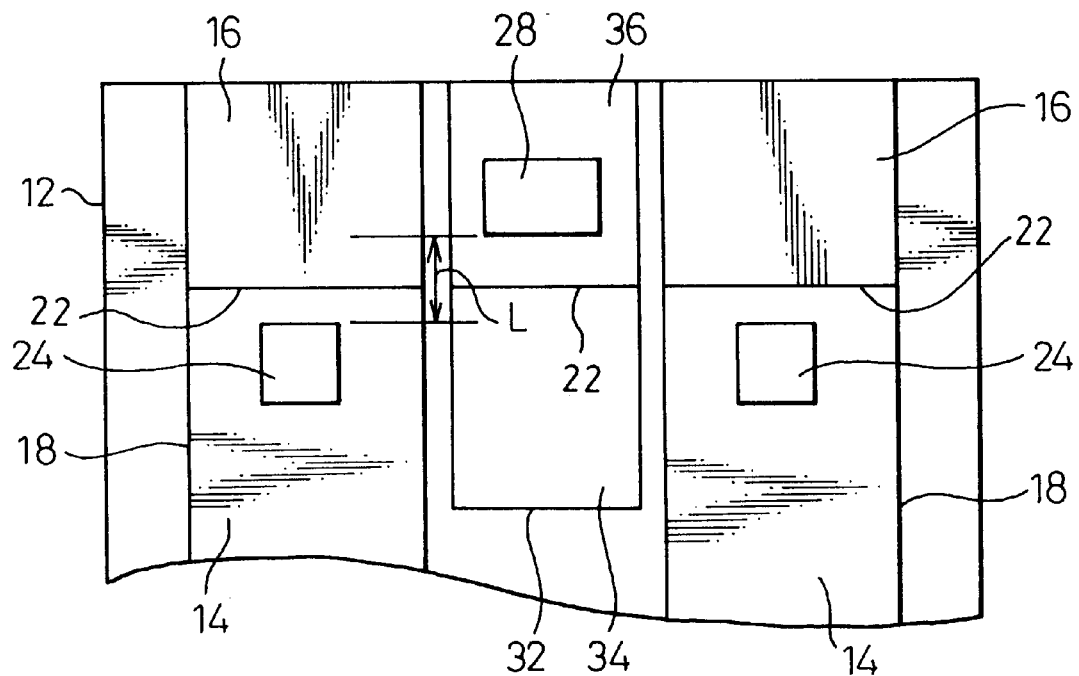
FIG. 10 is a partially enlarged bottom plan view of the modification of the magnetic head slider of FIG. 1A.

Further, in the present invention, a first or air introducing side pad and a second or auxiliary pad, arranged at the opposite sides relative to a joint portion 22, may be located so as not to be just opposed to each other, as shown in FIG. 10. In the modification shown in FIG. 10, each of a pair of side rails 18 respectively formed near the opposed side edges, defined in relation to an air flow direction, of a slider body 12, is provided with a first or air introducing side pad 24 and an additional center rail 32 formed at a location near an air introducing end and between the side rails 18 is provided on a tapered surface 36 thereof with a second or auxiliary pad 28 at a position away from each first pad 24 and close to a joint portion 22. This arrangement also possesses the same characteristic effects as the above-mentioned magnetic head slider 10, as far as a distance "L" measured in the air flow direction between each first pad 24 and the second pad 28 is determined to be at least twice the dimensional tolerance of the tapered surfaces 16, 36 defined in the air flow direction.

Generally, in a magnetic head slider with an adhesion-free slider structure, the total surface area of plural adhesion preventing pads coming into contact with the surface of a magnetic disk may be optimized depending on the roughness of magnetic disk surface, lubricant properties, and so on, to obtain the desired adhesion or friction force. In this respect, to determine the total surface area of the adhesion preventing pads, a magnetic head slider for estimation of adhesion force, which has a structure equivalent to that of a magnetic head slider actually incorporated into a magnetic disk drive, has been used to measure and estimate adhesion force on a specified magnetic disk.

Such a magnetic head slider for estimation of adhesion force is constructed to measure a distortion caused in a swing arm carrying thereon a magnetic head slider during the period after a magnetic disk starts to rotate and before the magnetic head slider starts to fly, and thereby to estimate adhesion force. Therefore, it is not required to design the magnetic head slider for estimation in consideration of the flying properties of the slider on a magnetic disk. On the other hand, it is required to form plural adhesion preventing pads into accurate dimensions, because the fluctuation of a pad surface area affects the adhesion force. In such a situation, it is necessary to prevent the dimensional tolerance of a machined tapered surface from affecting the dimension of the adhesion preventing pads. To this end, the present invention also provides a magnetic head slider for estimation of adhesion force, which adopts the structure of the above-described first or air introducing side pad.

Figure 11:
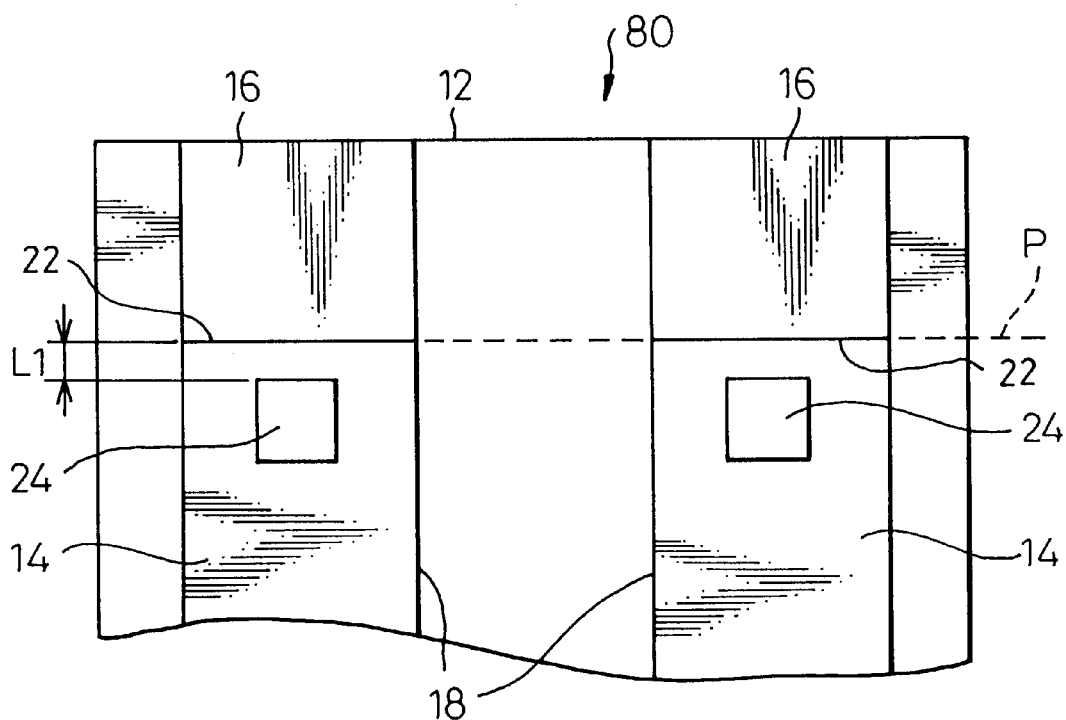
FIG. 11 is a partially enlarged bottom plan view of a magnetic head slider according to yet further embodiment of the present invention.

FIG. 11 shows a magnetic head slider 80 for estimation of adhesion force, according to an embodiment of the present invention, in a partially enlarged view. The components of the magnetic head slider 80 identical or corresponding to the components of the magnetic head slider 10 are denoted by the common reference numerals and are not described again.

The magnetic head slider 80 is provided with a pair of first or air introducing side pads 24 arranged so as to be one for each of a pair of rails 18 and close to joint portions 22. Each first pad 24 is located on each rail 18 at a position outside the maximum limit of size of a tapered surface 16 in an air flow direction. That is, if each tapered surface 16 is machined into a reference size and each joint portion 22 lies along a reference position "P", a linear distance "L1" measured in an air flow direction between each joint portion 22 and each first pad 24 is selected as being at least an upper tolerance.

In the magnetic head slider 80 having the above structure, as far as each tapered surface 16 formed by a machining process has a length in the air flow direction of which an error is in a dimensional tolerance, it is possible to prevent the first pads 24 formed thereafter from being located across the joint portions 22. Consequently, the fluctuation of the total surface area of contact of the air introducing and discharging side pads 24, 26 with the magnetic disk can be prevented, and thereby the unevenness of adhesion or friction force between the slider and the disk can be eliminated. As a result, as far as each of the air introducing and discharging side pads 24, 26 are accurately formed at desired positions, it is possible to obtain the adhesion force conforming to a desired value, even when each tapered surface 16 is formed with an error in the dimensional tolerance. Therefore, the magnetic head slider 80 can be effectively used for estimation of adhesion force.

It should be noted that the magnetic head slider 80, provided with no auxiliary pad which is formed in the former embodiments, cannot prevent each joint portion 22 between an ABS 14 and the tapered surface 16 from being soiled due to a contact with a magnetic disk surface during a pitching motion of the magnetic head slider 80 generated in an initial flying stage thereof. However, the magnetic head slider 80 is exclusively used for the estimation of adhesion force, so that such a difficulty need not be considered.

The present invention may be applied not only to magnetic head sliders and magnetic disk drives using them, as the above-described embodiments, but also to the other various head sliders used in the other disk drives, such as a optical disk drive, and to such other disk drive.

As is apparent from the above description, the present invention provides a low-flying type head slider, having a tapered surface at an air introducing end, which can reduce a flying height by adopting an adhesion-free slider structure, and which can eliminate or at least reduce an unevenness of adhesion force between the slider and a disk to prevent a joint portion mutually joining an ABS and the tapered surface from being soiled. The present invention can also improve the capacity and density of the recording properties of a disk drive by incorporating therein the inventive head slider.

While the invention has been particularly shown and described with reference to preferred embodiments thereof, it will be understood by those skilled in the art that various changes and modifications may be made without departing from the spirit and scope of the following claims.

What is claimed is:

1. A head slider comprising:
   a slider body provided with an air bearing surface arranged on one surface of said slider body and a tapered surface arranged adjacent to an air introducing end of said air bearing surface, said air bearing surface and said tapered surface being formed on at least one rail part extending in an air flow direction;
   at least one first pad formed entirely on and projecting from said air bearing surface, wherein said at least one first pad includes a first end surface defined by a first closed perimeter and a first upright portion extending from all sides of said first closed perimeter to said air bearing surface, said at least one first pad being located close to a joint portion between said air bearing surface and said tapered surface, an individual one of said at least one first pad being arranged on one of said at least one rail part; and
   at least one second pad formed entirely on and projecting from said tapered surface, wherein said at least second pad includes a second end surface defined by a second closed perimeter and a second upright portion extending from all sides of said second closed perimeter to said tapered surface, said at least one second pad being located close to said joint portion and away from said at least one first pad, an individual one of said at least one second pad being arranged on one of said at least one rail part.

2. A head slider as claimed in claim 1, wherein said first pad is spaced from said joint portion.

3. A head slider as claimed in claim 1, wherein said second pad is spaced from said joint portion.

4. A head slider as claimed in claim 1, wherein a distance between said first pad and said second pad in the air flow direction is determined to be at least twice a dimensional tolerance, in the air flow direction, of said tapered surface.

5. A head slider as claimed in claim 4, wherein said dimensional tolerance is 10% to 30% of a reference size, in the air flow direction, of said tapered surface.

6. A head slider as claimed in claim 1, wherein plural first pads are arranged opposite to respective plural second pads in relation to said joint portion.

7. A head slider as claimed in claim 1, further comprises at least one third pad formed on and projecting from said air bearing surface and said tapered surface, said at least one third pad extending across said joint portion.

8. A head slider as claimed in claim 1, wherein said at least one rail part includes first and second rail parts formed near opposed side edges of said slider body in relation to the air flow direction, and wherein said at least one first pad is disposed entirely on said first rail part.

9. A head slider as claimed in claim 8, wherein said at least one second pad is disposed entirely on said first rail part.

10. A disk drive comprising:
    a head slider as claimed in claim 8; and
    a disk provided with a locally roughened region on a surface of said disk;
    wherein said second rail part of said head slider is positioned nearer said locally roughened region than said first rail part.

11. A disk drive comprising a head slider as claimed in claim 1.

12. A head slider as claimed in claim 1, wherein said at least one second pad is the only pad positioned on said tapered surface along a line extending in the air flow direction.

13. A head slider as claimed in claim 1, wherein said slider body further includes two rail parts extending in the air flow direction in a generally parallel manner to each other.

14. A head slider as claimed in claim 13, wherein said two rail parts are integrally connected by a third rail part.

15. A head slider as claimed in claim 1, wherein:

a joint portion is defined between said tapered surface and said air bearing surface; and a separation distance between said first pad and said second pad in the air flow direction is large enough so that it is at least equal to or greater than twice a dimensional tolerance, in the air flow direction of said tapered surface, but further wherein said separation distance is small enough to prevent contact between said joint portion and a disk surface.

16. A head slider comprising:

a slider body provided with an air bearing surface arranged on one surface of said slider body and a tapered surface arranged adjacent to an air introducing end of said air bearing surface, said air bearing surface and said tapered surface being formed on at least one rail part extending in an air flow direction;

at least one first pad formed entirely on and projecting from said air bearing surface, said at least one first pad being located close to a joint portion between said air bearing surface and said tapered surface;

at least one second pad formed entirely on and projecting from said tapered surface, said at least one second pad being located close to said joint portion and away from said at least one first pad;

a joint portion defined between said tapered surface and said air bearing surface; and wherein a separation distance between said first pad and said second pad in the air flow direction is large enough so that it is at least equal to or greater than twice a dimensional tolerance, in the air flow direction of said tapered surface, but further wherein said separation distance is small enough to prevent contact between said joint portion and a disk surface.

* * * * *